United States Patent Office 3,247,169
Patented Apr. 19, 1966

---

3,247,169
NOVEL UNSATURATED ESTERS AND THE HOMO- AND COPOLYMERS THEREOF
John R. Caldwell and Edward H. Hill, Kingsport, Tenn., assignors to Eastman Kodak Company, Rochester, N.Y., a corporation of New Jersey
No Drawing. Filed Nov. 7, 1963, Ser. No. 322,017
14 Claims. (Cl. 260—78.4)

The present invention relates to novel unsaturated esters, and to homo- and copolymers thereof. More specifically, the invention concerns the 7,7-dialkylbicyclo(3.2.0)-hept-6-yl esters of $\alpha,\beta$-unsaturated dicarboxylic acids, and the thermoplastic homo- and copolymers of these esters.

In the field of molding plastics, synthetic fibers, and films, the search for plastics having, in addition to processability, improved thermal stability and higher melting temperatures, is a continuous one. Therefore, the present invention has as its primary objects to provide a new class of monoolefinic esters, the homopolymers thereof, and copolymers thereof with a large variety of monoolefins to produce a great variety of polymers whose properties may be tailored, for example, by the selective use of the comonomers, to give certain prescribed physical and chemical properties.

These and other objects hereinafter becoming evident have been achieved in accordance with the present invention through the discovery that monoolefinic esters comprising the maleic, fumaric and itaconic esters of unsaturated carbinols of the formula

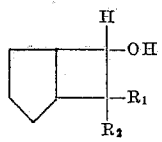

wherein $R_1$ and $R_2$ are selected from the group consisting of —$CH_3$, —$C_2H_5$, —$C_3H_7$, and —$C_4H_9$ radicals, when either homo- or copolymerized with one or more monoolefins, provide a wide variety of useful compounds. These monomers are useful as chemical intermediates for the preparation of various derivatives thereof and are especially valuable as intermediates for preparing resinous thermoplastic polymers that are useful for the manufacture of films, fibers, sheets, tubes, molded objects and as oil additives.

The maleic and fumaric monoolefinic esters may be represented by the formula

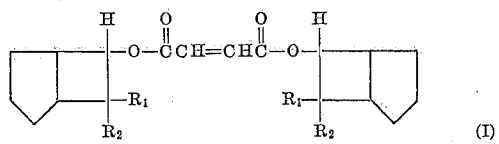

(I)

and those of itaconic acid by the formula

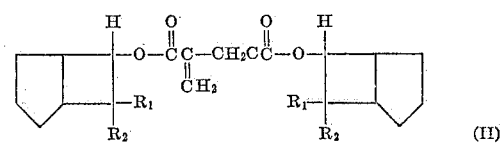

(II)

wherein $R_1$ and $R_2$ are as above defined. It is noted that $R_1$ and $R_2$ include, for example, methyl, ethyl, isopropyl and butyl, and may be the same or different.

The saturated carbinols may be prepared according to the following reaction series:

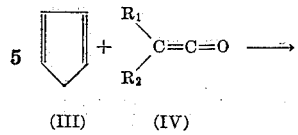

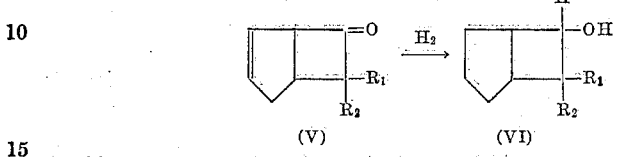

In this reaction series, the dialkylketene (IV) prepared by pyrolysis of dialkylacetic acid anhydrides as disclosed in Canadian Patent 618,772, is reacted with cyclopentadiene (III) according to the method of Staudinger and Meyer, Helv. Chim. Acta, 7, 21 (1924) to give the 7,7-dialkylbicyclo(3.2.0)heptan-6-ones (V). These ketones are then reduced in the presence of hydrogenation catalysts at elevated temperatures with hydrogen under pressure to the saturated carbinols (VI). The esters are obtained by refluxing a mixture containing maleic, fumaric or itaconic acid, the carbinol, an aromatic hydrocarbon such as toluene, xylene or cumene, and a catalyst such as titanium tetraisopropoxide or dibutyltin oxide. The water which is formed in the reaction is removed as an azeotrope with the hydrocarbon and collected in a Dean-Stark trap. The reaction is complete when no more water is obtained. A slight excess of the alcohol is added to ensure completion of the reaction. When $R_1$ or $R_2$ is larger than methyl, it is preferable to use one of the higher boiling solvents such as xylene or cumene. The higher temperature aids in overcoming the steric effect of the larger alkyl groups.

The polymerizations for preparing the resinous thermoplastic polymers of the invention may be carried out conveniently in an organic solvent such as one of the lower alcohols, ketones or esters or in a hydrocarbon such as benzene, toluene or hexane. Mass or bulk polymerizations may also be used. The polymerizations can also be carried out by dispersing the monomers in water and adding suitable dispersing agents. Catalysts, heat and actinic light accelerate the reactions. Suitable catalysts that can be used alone or in admixture include peroxides such as benzoyl peroxide, acetyl peroxide, lauroyl peroxide, tertiary butyl hydroperoxide, hydrogen peroxide, etc., persulfates such as sodium, potassium and ammonium persulfates, perborates such as sodium and potassium perborates, etc. Azobis-isobutyronitrile may also be employed as a catalyst. The amount of catalyst used can vary from about 0.1 to 3.0%, based on the weight of monomer to be polymerized. The temperature can vary over a wide range e.g. from 20°–130° C., but preferably the polymerizations are carried out at from about 50°–70° C. The polymerizations can be carried out by batch or continuous processes at atmospheric or higher pressures. If desired, an inert atmosphere such as nitrogen can be maintained in the reaction vessel. When carried out in a nonsolvent medium such as water, an activating agent such as an alkali metal bisulfite e.g. sodium or potassium bisulfite may advantageously be employed. Also, it is advantageous in an aqueous system to employ surface active agents such as fatty alcohol sulfates e.g. sodium or potassium cetyl sulfate, sodium or potassium lauryl sulfate, etc., aromatic sulfonates e.g. sodium or potassium salts of alkylnaphthalene sulfonic acid, sulfonated oils, and the like. These surface active agents may be employed up to about 3–5% of the weight of the monomer to be polymerized. If desired, a chain regulator such as an alkyl mercaptan e.g. hexyl, cetyl, lauryl, myristyl, etc. mercaptans, can be employed.

For preparing the resinous thermoplastic copolymers of the invention, a mixture comprising at least one of the monomeric unsaturated esters of the invention represented by above Formulas I and II and one or more polymerizable compounds containing but a single olefinic unsaturation represented by a $>C=C<$ group is polymerized by the above-described processes. While any proportions can be employed, preferably the proportions are from 10–90% by weight of the unsaturated esters of the invention and conversely from 90–10% by weight of the vinyl comonomer. In general, the resulting copolymers have approximately the same composition of components as contained in the starting polymerization reaction mixtures. Suitable polymerizable comonomers include acrylic and methacrylic alkyl esters wherein the alkyl groups contain from 1–8 carbon atoms, e.g., methyl, ethyl, propyl, isopropyl, butyl, octyl, etc., acrylates and methacrylates, acrylic and methacrylic acid amides including N-alkyl and N,N-dialkyl substituted amides thereof wherein the alkyl group in each instance contains from 1–4 carbon atoms, e.g., acrylamide, methacrylamide, N-methylacrylamide, N-n-butylacrylamide, N,N-dimethylacrylamide, N,N-dipropylacrylamide, etc., ad the corresponding alkyl substituted alkyl methacrylamides, vinyl and isopropenyl esters of monobasic saturated fatty acids containing from 2–18 carbon atoms, e.g., vinyl acetate, vinyl propionate, vinyl butyrate, vinyl stearate, etc., and corresponding isopropenyl esters, vinyl alkyl ethers wherein the alkyl group contains from 1–4 carbon atoms, e.g., vinyl methyl ether, vinyl ethyl ether, etc., vinyl alkyl ketones wherein the alkyl group contains from 1–4 carbon atoms, e.g., vinyl methyl ketone, etc., vinyl derivatives of benzene, e.g., styrene, α-methylstyrene, p-acetaminostyrene, etc., unsaturated nitriles, e.g., acrylonitrile, methacrylonitrile, etc., vinyl and vinylidene halides, e.g., vinyl chloride, vinyl fluoride, vinylidene chloride, vinylidene fluoride, etc., tetrafluoroethylene, chlorotrifluoroethylene, N-vinyl imides such as N-vinylsuccinimides, N-vinylphthalimide, etc., N-vinyl lactams, e.g., N-vinylpyrrolidone, N-vinylpiperidone, etc., α-olefins containing from 2–8 carbon atoms, e.g., ethylene, isobutylene, etc., acrylic and methacrylic acids, and monoalkyl and dialkyl esters of α,β-unsaturated dicarboxylic acids wherein the alkyl group contains from 1–4 carbon atoms, e.g., monomethyl maleate, monobutyl maleate, dimethyl maleate, dibutyl maleate, etc., and corresponding esters of fumaric, itaconic, and citraconic acids, and the like.

Such resinous thermoplastic polymers are soluble in common organic solvents such as carbon tetrachloride, chloroform, benzene, toluene, mineral oils, tertiary butyl alcohol, higher esters of phthalic acid, etc., but insoluble in solvents such as water, acetone, methanol, acetonitrile, Cellosolve, and the like. They vary from soft gums represented by the homopolymers to materials having melting points up to about 250° C. represented by various copolymers which on molding give clear, hard molded objects or flexible, tough films, fibers and sheets.

EXAMPLES OF MONOMER PREPARATION

*Example 1.—Bis(7,7-dimethylbicyclo[3.2.0]hept-6-yl) fumarate*

7,7-dimethylbicyclo[3.2.0]hept - 3-ene-6-one was prepared by the addition of cyclopentadiene to dimethylketene by a procedure similar to that of Staudinger and Meyer, Helv. Chim. Acta, 7, 21 (1924). The dimethylketene was obtained by cracking isobutyric anhydride. The unsaturated ketone was then reduced over Girdler G–49 nickel catalyst at 150° C. with 1500 p.s.i. hydrogen. The 7,7-dimethylbicyclo[3.2.0]heptan-6-ol was then esterified by refluxing a solution containing 308 g. (2.2 moles) of the cyclic alcohol, 116 g. (1.0 mole) of fumaric acid, 100 ml. of toluene, and 0.2 g. of titanium tetraisopropoxide. The water formed was collected in a Dean-Stark trap filled with toluene. After the theoretical amount of water was obtained (36 ml.), the solution was cooled, washed with sodium bicarbonate solution, and dried with sodium sulfate. After removal of the solvent the product was molecularly distilled at 97–99° C. and 168 microns of Hg; $n_D^{20}=1.4997$.

*Analysis.*—Calcd. for $C_{22}H_{32}O_4$: C, 73.3; H, 8.9. Found: C, 73.0; H, 8.7.

*Example 2.—Bis(7,7-dimethylbicyclo[3.2.0]hept-6-yl) maleate*

The procedure of Example 1 was repeated using maleic acid. After the reduction was completed, the solution was washed with sodium bicarbonate solution, dried over sodium sulfate and concentrated. The ester was pure enough to give polymers without distilling.

*Example 3.—Bis(7,7-methylethylbicyclo[3.2.0]heptan-6-yl)itaconate*

7,7-methylethylbicyclo[3.2.0]heptan-6-ol was prepared by procedures similar to those of Example 1. The methylethylketene was obtained by cracking 2-methylbutyric anhydride. The esterification of itaconic acid was carried out as in Example 1 and the ester was isolated as in Example 2.

*Example 4.—Bis(7,7-ethylbutylbicyclo[3.2.0]hept-6-yl) fumarate*

7,7-ethylbutylbicyclo[3.2.0]heptan-6-ol was prepared by procedures similar to those of Example 1. The ethylbutylketene was obtained by cracking 2-ethylhexanoic anhydride. Esterification of fumaric acid was carried out as in Example 1 and the ester isolated as in Example 2.

EXAMPLES OF POLYMER PREPARATION

*Example 5*

The following materials were placed in a pressure bottle and tumbled at 70° C. for 48 hours:

| | |
|---|---|
| Bis(7,7 - methylethylbicyclo[3.2.0]hept-6-yl)itaconate _____ g__ | 50 |
| Tert-butyl alcohol _____ ml__ | 450 |
| Benzoyl peroxide _____ g__ | 0.5 |

The soft gum obtained weighed 31 g. after being washed in ethanol and dried. It was useful as a lubricating oil additive.

*Example 6*

The following materials were refluxed in a flask for 24 hours:

| | |
|---|---|
| (0.05 mole) bis(7,7-dimethylbicyclo[3.2.0]hept-6-yl) fumarate _____ g__ | 16.6 |
| (0.05 mole) vinyl stearate _____ g__ | 15.5 |
| Tert-butyl alcohol _____ ml__ | 200 |
| Benzoyl peroxide _____ g__ | 0.6 |

A clear, soft gum was obtained which was purified by dissolving in benzene and precipitating in ethanol several times. After drying, the polymer weighed 28.8 g. This polymer was tested as an additive in mineral oil. The table below compares its performance with mineral oil alone and with Acryloid 618 (a commercial oil additive).

| | Viscosity in cs. | | ASTM Slope | Viscosity Index |
|---|---|---|---|---|
| | 100° C. | 210° C. | | |
| 2% fumarate polymer | 40.85 | 6.67 | 0.71 | 133.2 |
| 2% Acryloid 618 | 28.35 | 5.45 | 0.69 | 139.0 |
| Mineral oil | 23.95 | 4.32 | 0.77 | 92.2 |

The first and second column show the difference in viscosity of the oil at two different temperatures with and without the additives. The third column is an indication of the rate of change of the viscosity with temperature. A small numerical value is desirable. The viscosity index of the fourth column is an empirical number indicating the effect of change in temperature on the viscosity with temperature. Thus, it can be seen that the copolymer improves the mineral oil in every case and in addition is superior in producing and maintaining a relatively higher viscosity over the temperature range of 100–210° C.

Example 7

Using the method of preparation, purification, and testing of Example 6, a copolymer was prepared from 1 mole of bis(7,7-dimethylbicyclo[3.2.0]hept-6-yl) fumarate and 1 mole vinyl stearate. It had a viscosity value of 29.1 at 100° C. and 5.3 at 210° C., an ASTM slope of 0.70, and a viscosity index of 113.

Example 8

The following materials were placed in a pressure bottle and tumbled at 60° C. for 20 hours:

(0.075 mole) bis(7,7-dimethylbicyclo[3.2.0]hept-6-yl)maleate _____g-- 24.9
(0.075 mole) isopropenyl acetate _____g-- 7.5
Tert-butyl alcohol _____ml-- 100
Azobis(isobutyronitrile) _____g-- 0.4

A clear, viscous dope was obtained and precipitated by pouring into acetonitrile. After drying the polymer weighed 30 g. It was useful as an oil additive.

Example 9

The following materials were placed in a pressure bottle and tumbled at 70° C. for 24 hours:

Bis(7,7 - ethylbutylbicyclo[3.2.0]hept - 6-yl)fumarate _____g-- 16
Styrene _____g-- 64
Toluene _____ml-- 500
Acetyl peroxide _____g-- 1.0

A viscous dope was obtained and isolated by pouring into acetonitrile. The polymer weighed 71 g., and an oxygen analysis showed it contained 18.4% of the fumarate. The polymer was compression molded into clear, hard buttons.

Example 10

A mixture of 5 g. of bis(7,7-diethylbicyclo[3.2.0]hept-6-yl) fumarate and 45 g. of acrylonitrile was slowly added over a period of 2 hours to a stirred solution of 0.5 g. of ammonium persulfate, 0.3 g. of sodium bisulfite, and 1.5 g. of lauryl sulfate at 60° C. At the end of 18 hours the polymer was isolated by filtration and washed with water and isopropyl alcohol. A dope was made in dimethylformamide and wet spun into fibers having a tenacity of 2.9 g./den. and an elongation of 22%. The fibers dyed well with disperse dyes.

Example 11

The following materials were placed in a pressure bottle and tumbled at 70° C. for 20 hours:

Bis(7,7 - diethylbicyclo[3.2.0]hept - 6 - yl)maleate _____g-- 20
Vinyl chloride _____g-- 80
Tert-butyl alcohol _____ml-- 400
Azobis(isobutyronitrile) _____g-- 1.0

The white powder obtained was isolated by filtration and washed with isopropyl alcohol. It weighed 91 g. and a chlorine analysis showed that it contained 82.4% vinyl chloride. After the addition of 5% by weight of dibutyltin dilaureate as a stabilizer, it could be molded into clear, hard objects by injection molding.

Example 12

Using the method of Example 11, a copolymer was prepared containing 70% methyl methacrylate and 30% bis(7,7-dimethylbicyclo[3.2.0]hept-6-yl) itaconate. It was an excellent molding plastic.

Example 13

Using the method of Example 10, a copolymer was prepared containing 1 mole of vinyl acetate and 1 mole of bis(7,7-dibutylbicyclo[3.2.0]hept-6-yl) fumarate. The polymer was useful as an oil additive.

The invention has been described in detail with particular reference to preferred embodiments thereof but it will be understood that variations and modifications can be effected within the spirit and scope of the invention as described hereinabove and as defined in the appended claims.

We claim:

1. A thermoplastic copolymer of at least one unsaturated ester selected from those having the formulas

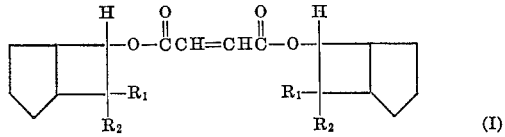

and

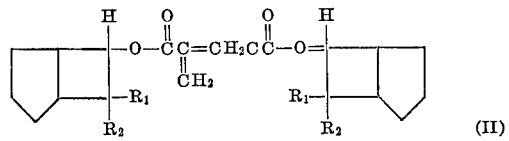

wherein $R_1$ and $R_2$ are selected from the group consisting of —$CH_3$, —$C_2H_5$, —$C_3H_7$ and —$C_4H_9$ radicals, and at least one other monoolefinically unsaturated material.

2. The copolymer of claim 1 wherein said other monoolefinically unsaturated material is selected from the group consisting of vinyl stearate, isopropenyl acetate, styrene, acrylonitrile, vinyl chloride, methyl methacrylate and vinyl acetate.

3. A thermoplastic copolymer of an unsaturated ester having the formula

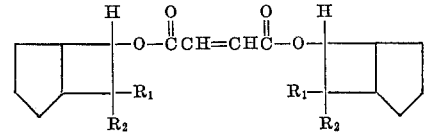

wherein $R_1$ and $R_2$ are selected from the group consisting of —$CH_3$, —$C_2H_5$, —$C_3H_7$ and —$C_4H_9$ radicals, and at least one other monoolefinically unsaturated material.

4. A thermoplastic copolymer of an unsaturated ester having the formula

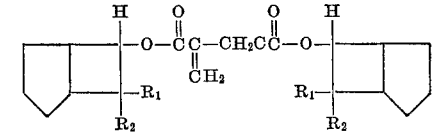

wherein $R_1$ and $R_2$ are selected from the group consisting of —$CH_3$, —$C_2H_5$, —$C_3H_7$ and —$C_4H_9$ radicals, and at least one other monoolefinically unsaturated material.

5. A copolymer of 7,7-dimethylbicyclo(3.2.0)hept-6-yl fumarate and vinyl stearate.

6. A copolymer of 7,7-ethylbutylbicyclo(3.2.0)hept-6-yl fumarate and styrene.

7. A copolymer of 7,7-diethylbicyclo(3.2.0)hept-6-yl fumarate and acrylonitrile.

8. A copolymer of 7,7-dibutylbicyclo(3.2.0)hept-6-yl fumarate and vinyl acetate.

9. A copolymer of 7,7-dimethylbicyclo(3.2.0)hept-6-yl maleate and isopropenyl acetate.

10. A copolymer of 7,7-diethylbicyclo(3.2.0)hept-6-yl maleate and vinyl chloride.

11. A copolymer of 7,7-dimethylbicyclo(3.2.0)hept-6-yl itaconite and methyl methacrylate.

12. A homopolymer of 7,7-methylethyl(3.2.0)hept-6-yl itaconate.

13. An ester of the formula

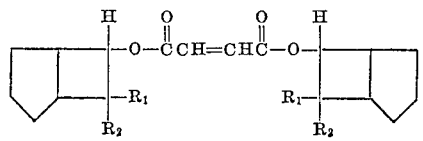

wherein $R_1$ and $R_2$ are selected from the group consisting of —$CH_3$, —$C_2H_5$, —$C_3H_7$ and —$C_4H_9$ radicals.

14. An ester of the formula

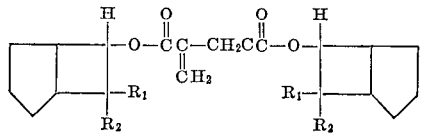

wherein $R_1$ and $R_2$ are selected from the group consisting of —$CH_3$, —$C_2H_5$, —$C_3H_7$ and —$C_4H_9$ radicals.

References Cited by the Examiner

UNITED STATES PATENTS

| | | | |
|---|---|---|---|
| 3,038,887 | 6/1962 | Caldwell et al. | 260—78.5 |
| 3,113,963 | 12/1963 | Caldwell et al. | 260—473 |

JOSEPH L. SCHOFER, *Primary Examiner.*